United States Patent [19]
DeCaro

[11] Patent Number: 4,463,277
[45] Date of Patent: Jul. 31, 1984

[54] COMPACT HALOGEN-CYCLE INCANDESCENT LAMP, AND LAMP UNIT UTILIZING SUCH LAMP AS A LIGHT SOURCE

[75] Inventor: Aristide R. DeCaro, Bayside, N.Y.

[73] Assignee: North American Philips Lighting Corporation, New York, N.Y.

[21] Appl. No.: 441,352

[22] Filed: Nov. 15, 1982

Related U.S. Application Data

[63] Continuation-in-part of Ser. No. 176,627, Aug. 11, 1980, abandoned.

[51] Int. Cl.³ ............................. H01K 1/28; H01K 1/50
[52] U.S. Cl. ...................................... 313/25; 313/113; 313/573; 313/579
[58] Field of Search .................. 313/579, 25, 113, 643, 313/572, 573

[56] References Cited

U.S. PATENT DOCUMENTS

| | | | |
|---|---|---|---|
| 2,228,342 | 1/1941 | Claude | 313/25 |
| 3,194,625 | 7/1965 | Danko | |
| 3,364,378 | 1/1968 | Beesley | 313/113 X |
| 3,496,401 | 2/1970 | Dumbaugh | 313/579 |
| 3,553,520 | 1/1971 | Hicks | 313/113 |
| 3,641,386 | 2/1972 | Audesse et al. | 313/579 |
| 3,648,094 | 3/1972 | DeCaro | 313/579 |
| 3,798,491 | 3/1974 | Malm | 313/315 |
| 3,829,729 | 8/1974 | Westlund, Jr. et al. | 313/579 |
| 3,843,899 | 10/1974 | T'Jampens et al. | 313/579 |
| 3,956,659 | 5/1976 | Almer et al. | 313/579 |
| 3,978,362 | 8/1976 | Dumbaugh et al. | 313/579 X |
| 4,074,167 | 2/1978 | Van Den Broek et al. | 313/579 |
| 4,163,171 | 7/1979 | Wurster | 313/579 |
| 4,238,704 | 12/1980 | Bonk et al. | 313/113 |
| 4,262,228 | 4/1981 | Cruse | 313/113 X |
| 4,354,137 | 10/1982 | Martin et al. | 313/579 |

FOREIGN PATENT DOCUMENTS

| | | |
|---|---|---|
| 750519 | 1/1967 | Canada. |
| 763062 | 7/1967 | Canada. |

*Primary Examiner*—Palmer C. Demeo

[57] ABSTRACT

A compact halogen-cycle type incandescent lamp is provided with an envelope that is composed of a selected hard glass (a borosilicate or an aluminosilicate type glass for example) and then dosed with an amount of bromine which is correlated with the glass composition in such a manner that it counteracts the deleterious release of water-vapor forming constituents by the glass envelope when the lamp is energized and the glass is hot. The halogen-cycle lamp is especially adapted for use as the concentrated light source in a general service type lamp or a sealed-beam headlamp and, when so employed, has a fill gas pressure that is so correlated with the gas pressure of the non-oxidizing atmosphere in the outer envelope that the total gas pressure does not exceed 1,000 Torr and the envelope of the halogen-cycle lamp operates at a temperature which is sufficient to reliably sustain the halogen cycle but is below the softening temperature of the particular hard glass from which the halogen lamp envelope is made. In the case of a lamp intended for general lighting or residential illuminating purposes, the halogen-cycle lamp component contains iodine rather than bromine since iodine-cycle lamps produce a "warm" light effect.

12 Claims, 4 Drawing Figures

COMPACT HALOGEN-CYCLE INCANDESCENT LAMP, AND LAMP UNIT UTILIZING SUCH LAMP AS A LIGHT SOURCE

CROSS-REFERENCE TO RELATED APPLICATIONS

This application is a continuation-in-part of application Ser. No. 176,627 filed Aug. 11, 1980, and now abandoned.

BACKGROUND OF THE INVENTION

This invention generally relates to electric lamps and has particular reference to an improved halogen-cycle type incandescent lamp and to an improved lamp unit that utilizes the halogen-cycle lamp as a light source component.

Halogen-cycle incandescent lamps are well known in the art and utilize a halogen, such as bromine or iodine, within the envelope which returns vaporized tungsten back to the filament and thus prevents the envelope walls from progressively blackening and drastically reducing the light output of the lamp during its useful life. Due to the high bulb-wall temperatures involved and the use of a halogen-containing atmosphere, the envelopes of such lamps were generally made from quartz. However, in order to reduce the material and manufacturing costs, halogen-cycle incandescent lamps have been developed which employ envelopes that are composed of various kinds of hard glasses. Canadian Pat. No. 763,062, issued July 11, 1967 to L. Bouwman et al., for example, discloses a halogen type incandescent lamp that has a borosilicate glass envelope which contains iodine and a small amount of phosphorus which serves as a getter for residual oxygen and other impurities in the lamp. Halogen incandescent lamps that contain bromine and have borosilicate glass envelopes are also disclosed in U.S. Pat. Nos. 3,641,386 (Audesse et al) and 3,648,094 (DeCaro et al). Various kinds of aluminosilicate glass compositions have also been employed in the manufacture of envelopes for halogen-cycle incandescent lamps, as disclosed in U.S. Pat. Nos. 3,496,401 (Dumbaugh, Jr.); 3,798,491 (Malm) and 3,829,729 (Westlund et al). A halogen-cycle incandescent lamp having an envelope that is fabricated from hard glass (aluminosilicate or borosilicate) which is substantially devoid of alkali, carbon monoxide and water is disclosed in U.S. Pat. No. 4,163,171 (Wurster). The use of a special calcium aluminosilicate type glass as the envelope material for a tungsten-bromine lamp is disclosed in U.S. Pat. No. 3,978,362 (Dumbaugh, Jr. et al).

It is also well known in the art to employ such halogen-cycle incandescent lamps in lamp units of the general lighting or reflector type. Canadian Pat. No. 750,519 issued Jan. 10, 1967 to Meijer et al, for example, discloses a compact halogen-cycle lamp that is mounted within a parabolic reflector. A sealed-beam headlamp which contains a non-oxidizing atmosphere and a compact incandescent lamp of the halogen type that has a quartz envelope is disclosed in U.S. Pat. No. 3,553,520 issued Jan. 5, 1971 to Hicks. A lamp unit that is designed for general lighting service and employs a compact halogen-cycle lamp as the light source component is disclosed in U.S. Pat. No. 3,194,625 (Danko).

SUMMARY OF THE INVENTION

In accordance with the present invention, the cost reduction and manufacturing advantages of making the envelope of a halogen-cycle type incandescent lamp from hard glass rather than quartz and without the trouble and expense of using a getter to neutralize residual lamp impurities (or employing a specially prepared hard glass that is substantially devoid of alkali, etc.) are achieved by fabricating the halogen lamp envelope from a selected hard glass of the borosilicate or aluminosilicate type and employing bromine as the halogen in an amount that is correlated with the particular type of hard glass used such that the bromine content alone counteracts the harmful effects of impurities within the lamp which evolve from the envelope glass during operation. The present invention also correlates the wattage loading and physical size of the hard glass envelope in such a manner that the operating temperature of the envelope is maintained within a certain limit, depending upon the particular type of hard glass that is employed.

The improved halogen-cycle incandescent lamp is combined with an outer envelope of the proper size and shape that is filled with a suitable non-oxidizing gas to provide a lamp unit adapted for general lighting applications or as a sealed-beam headlamp for motor vehicles. Depending upon the particular type of hard glass employed for the halogen lamp envelope, the pressure of the inert atmosphere in the outer envelope is correlated with the fill gas pressure within the halogen lamp component in such a manner that the envelope of the halogen lamp operates at a sufficiently high temperature to ensure a reliable halogen-cycle effect without approaching the softening temperature of the glass or creating the potential danger of allowing the halogen lamp envelope to deform and possibly rupture while the lamp unit is in use. To provide a "warm" light output that is preferred for residential illumination, iodine is used as the halogen in the halogen-cycle lamp when it is employed as the inner lamp component for a general lighting type lamp unit.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENTS

Figure 1:
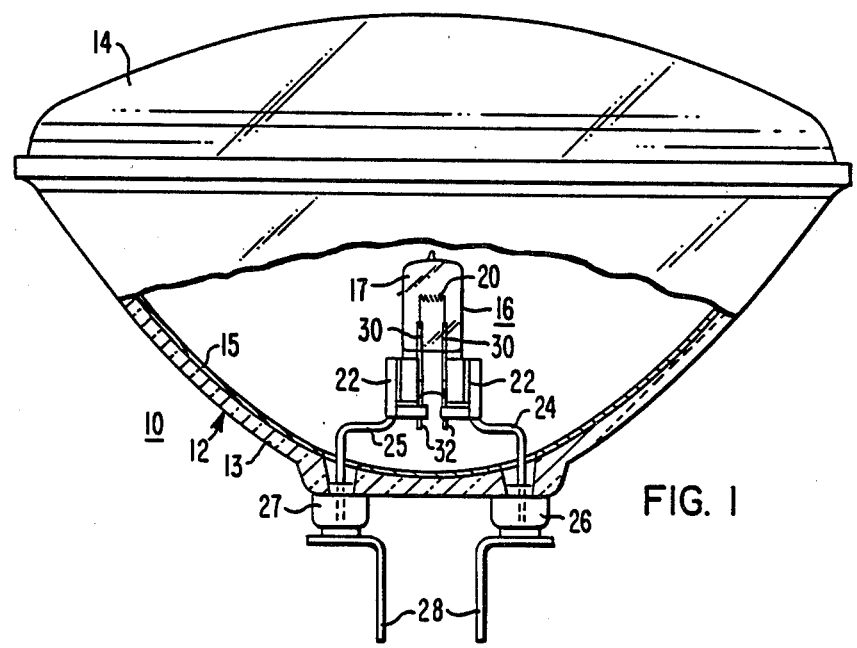
FIG. 1 is a front elevational view, partly in section, of a sealed-beam headlamp that embodies the invention and contains the improved halogen-cycle incandescent lamp which serves as a compact light source.

While the improved halogen-cycle incandescent lamp of the present invention can be employed as a separate light source or in combination with various kinds of outer envelopes to provide lamp units which will radiate or concentrate the light rays in the desired manner, it is especially adapted for use as the compact inner lamp component of a sealed-beam lamp unit 10 of the type shown in FIG. 1. Such units are used as headlamps on motor vehicles and, as shown, comprise a sealed housing or outer envelope 12 that is formed by a concave reflector component 13 which is sealed along its periphery to a dished cover component 14 which, in the case of a vehicle headlamp, constitutes a lens member that has the usual lightbending flutes and prisms (not shown) on its inner surface to provide the desired beam pattern. The inner surface of the concave reflector component 13 is coated with a layer 15 of aluminum or similar highly-reflective material in accordance with standard lamp-making practice. The reflector 13 and cover or lens component 14 are fabricated from glass or other suitable material (such as plastic) that can be readily joined together in hermetic fashion and will withstand the operating temperatures, etc. involved.

In the case of an automotive headlamp, the reflector component 13 is of paraboloidal configuration and thus has a focal point which is used as an optical reference point. A compact halogen-cycle incandescent lamp 16 which embodies the present invention and has a hard glass envelope 17 that contains a coiled tungsten filament 20 is mounted within the sealed-beam housing or outer envelope 12 in such a manner that the filament 20 is located at or near the focal point of the reflector component 13 and is thus optically coupled to the reflector surface in an effective manner. As will be noted in FIG. 1, the halogen-cycle lamp 16 is held in such position by a suitable mount structure such as a pair of clip-holders 22 of sheet metal that are secured to the sealed end of the envelope 17 and are fastened to the inner ends of a pair of rigid lead wires 24, 25 which extend through the back of the reflector component 13 and are secured to the usual metal thimbles 26, 27 or the like that are hermetically secured to the reflector component. A pair of blade-like contact members 28 are fastened to the metal thimbles to permit the headlamp 10 to be plugged into the socket provided in the lamp housing of the motor vehicle. Electrical connection of the lead wires 24, 25 with the lamp filament 20 is effected by tubular portions at the lower end of each of the metal clip-holders 22 which laterally extend along the sealed end of the halogen lamp 16 and are fastened to the respective outer lead portions 32 of the halogen lamp 16.

Figure 2:
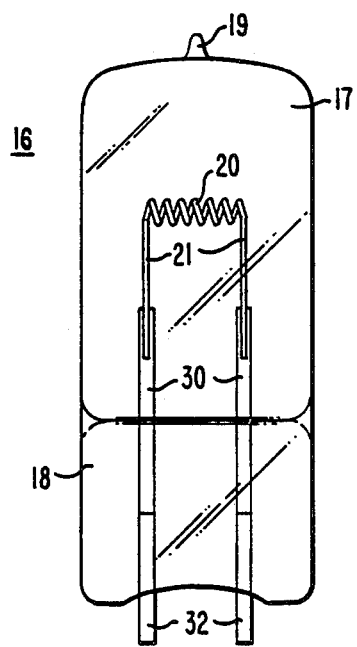
FIG. 2 is an enlarged front elevational view of the improved halogen-cycle inner lamp component employed in the headlamp shown in FIG. 1.

As shown more particularly in FIG. 2, the halogen-cycle incandescent lamp 16 has a compact envelope, 17 that is composed of a selected hard glass and is of tubular configuration with the coiled tungsten filament 20 disposed in transverse relationship relative to the envelope axis. The lamp 16 is of the so-called "baseless" type and is thus terminated at one end by a press seal 18 of fused glass and at its opposite end by a sealed tip 19 which constitutes the residue of a tubulation through which the envelope 17 is evacuated and then charged with a suitable inert fill gas and a controlled dose of halogen or a suitable halogen-releasing material. The tungsten filament 20 has a pair of legs 21 that are secured to the ends of a pair of inner lead-in conductors 30 which, in turn, are joined by a butt weld to a pair of rigid outer conductors 32 which protrude beyond the end of the seal 18 in the usual manner. The inner lead-in conductors 30 are made from molybdenum or tungsten or other suitable metal that can be readily sealed to the hard glass from which the envelope 17 is made and will also withstand the halogen atmosphere and provide a reliable and durable hermetic juncture throughout the useful life of the halogen lamp 16. The outer lead-in conductors 32 are composed of nickel or other suitable metal (such as nickel-plated iron) that also makes a good seal with the hard glass envelope 17.

In accordance with the present invention, the envelope 17 of the halogen lamp 16 is fabricated from either borosilicate type or aluminosilicate type glass. These glasses are well known in the art as "hard" glasses and thus have softening temperatures, coefficients of expansion, etc. which permit them to be readily formed and sealed to the metal parts of the filament mount assembly. Borosilicate glass compositions typically contain (in approximate percentages by weight) about 80% silica, 14% boric oxide, 4% soda ($Na_2O$) and 2% alumina. A suitable glass of this type is marketed by the Corning Glass Company under the trade name "Pyrex" No. 7740 glass and, in addition to having excellent chemical stability and heatshock resistance, it has a softening temperature of about 820° C. and a coefficient of thermal expansion of around $35 \times 10^{-7}$ in./in.°C.

Aluminosilicate type glasses are also well known in the art and one which is suitable for use as an envelope material for the halogen lamp component in accordance with the present invention is also marketed by Corning Glass Company under the trade designation No. 1720 glass. A typical composition contains approximately 68 percent. (by weight) silica, 19 percent alumina, 8 percent calcium oxide, 5 percent barium oxide and less than approximately 1 percent soda. This particular aluminosilicate glass has a softening temperature of around 910° C. and a coefficient of thermal expansion of $52 \times 10^{-7}$ in./in.°C.

Another type of aluminosilicate glass composition which is suitable for use as envelope material in accordance with the present invention is a glass of the type described in U.S. Pat. No. 3,798,491 that has a composition which comprises (in percent by weight) from 59 to 70% silica, from 10 to 20% alumina, and between 7.4 and 28% barium oxide. This glass has a softening point of approximately 1100° C. and a coefficient of expansion between 36 and $40 \times 10^{-7}$ in./in.°C.

SPECIFIC EXAMPLES

As specific examples of suitable compact halogen incandescent lamps, a miniature type lamp 16 employed in the vehicle headlamp 10 shown in FIG. 1 was manufactured from a piece of hard glass tubing 12.7 mm. in diameter and had an overall length of about 39 mm. with a press seal whose axial dimension was about 12.5 mm. Alternatively, the envelope 17 could be also formed from hard glass tubing that was approximately 15.9 mm. in diameter to provide a halogen-cycle lamp of slightly larger lateral dimension and volume. The lamp 16 contained no phosphorus, tantalum or other kind of getter and was charged with equal parts of krypton and nitrogen which formed a fill gas that was mixed with a suitable thermally-dissociable material (such as methylene bromide) that produced a controlled amount of free halogen within the energized lamp. The sealed-beam outer envelope or housing 12 which contained the halogen-cycle incandescent lamp 16 was filled with nitrogen or other suitable non-oxidizing gas to prevent the lead wires and lamp-holding clips from corrosive damage during operation at the elevated temperatures involved.

In accordance with the present invention, the fill gas pressures in the outer and inner envelopes are correlated to provide the proper thermal conditions for reliable operation of the halogen-cycle and prevent the compact lamp envelope 17 from operating at an excessively high temperature at its rated wattage rating. The halogen dosage in lamp 16 is also correlated with the particular type of hard glass employed in the lamp envelope 17 to counteract the deleterious effects of impurities released within the energized lamp due to the constituents in the hard glass.

Hence, when the halogen-cycle lamp envelope 17 is fabricated from borosilicate type glass, the maximum envelope temperature which is permissible is around 490° C. and the preferred operating temperature for the envelope wall is about 400° C. The wattage loading of the halogen lamp 16 is maintained at approximately 6 watts per square centimeter of envelope surface (22 watts per cubic centimeter of bulb volume), and approximately 0.2% by volume of methylene bromide is dosed into the lamp. In the case of a 50 watt lamp having an envelope about 39 mm. long and made from borosilicate glass tubing 15.9 mm. in diameter, the pressure of the fill gas within the halogen lamp is maintained within the range of from about 600 Torr to about 700 Torr and the pressure of the inert gas (nitrogen, for example) in the outer sealed-beam envelope 12 is maintained in the range of from about 300 Torr to about 400 Torr—with the inner and outer gas-pressure ranges being so correlated so that the total gas pressure is maintained at approximately 1,000 Torr.

In the case of a halogen-cycle lamp 16 having an envelope 17 which is fabricated from aluminosilicate type glass, the maximum allowable bulb temperature is approximately 650° C., the optimum operating temperature for the envelope wall is about 500° C., the wattage loading is maintained around 9 watts per square centimeter (42 watts per cubic centimeter of bulb volume), the methylene bromide dosage is reduced to about 0.1% by volume and the inner and outer fill gas pressure ranges are the same as in the previous example with the total gas pressure range again being kept at approximately 1,000 Torr. For a 50 watt lamp 39 mm. in length, the higher bulb-wall temperature and wattage loading were achieved by fabricating the envelope from aluminosilicate glass tubing 12.7 mm. in diameter (instead of the 15.9 mm diameter tubing used for the borosilicate-glass lamp described previously).

The use of the higher concentration of methylene bromide when the halogen-lamp envelope 17 is manufactured from borosilicate type glass constitutes an important feature of the invention since borosilicate type glasses have a higher content of OH constitutes (which evolve water vapor within the operating lamp) and the larger dosage of halogen provided by the additional amount of methylene bromide effectively counteracts this phenomenon and the shorter lamp life that would otherwise occur.

The fill gas in the halogen lamp 16 is not limited to a mixture of krypton and nitrogen but can comprise argon, krypton or xenon (either alone or admixed with one another—along with nitrogen if desired).

The fact that the fill pressure of the halogen lamp 16 is kept below one atmosphere not only greatly simplifies the manufacturing operation (since no cooling or freezing of the fill gas is necessary) but also reduces the material and labor cost of the lamp. The automated lamp-manufacturing equipment is also not as complicated and is able to operate at higher production speeds.

While the invention is shown and described in terms of a single-ended compact halogen-cycle lamp having a transversely-mounted filament, it will be understood by those skilled in the art that the invention can also be employed in compact lamps of double-ended construction as well as those which have longitudinally-extending filaments.

In addition to halogen incandescent lamps of the type illustrated which contain a single tungsten filament, the present invention also includes within its scope halogen-cycle lamps that contain several tungsten filaments as well as internal light shields, etc., if such is necessary to provide the required beam-pattern for the sealed-beam headlamp or other type of reflector lamp unit involved.

FIGS. 3 AND 4 EMBODIMENTS

Figure 3:
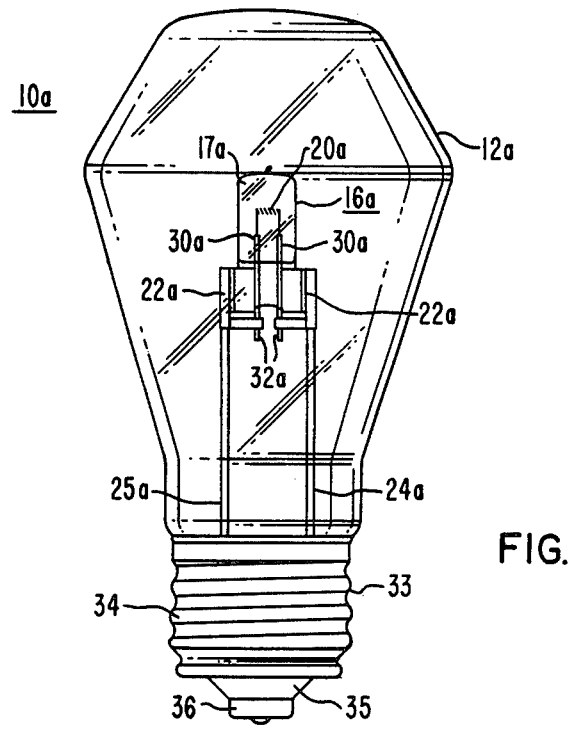
FIGS. 3 and 4 are front elevational views of two general lighting type lamp units that embody the invention and employ the halogen lamp of FIG. 2 as the inner lamp component.

An alternative lamp unit 10a designed for general lighting service is shown in FIG. 3. As illustrated, the outer envelope 12a in this embodiment is of tapered-cone shape and fitted with a screw-type base 33 comprising the usual metal shell 33, insulator 35 and end contact 36. One of the main lead-in wires or conductors 24a, 25a is connected to the base shell 33 and the other main lead wire is connected to the end contact 36. The halogen-cycle lamp 16a is of the same compact construction as in the FIG. 1 embodiment and is mounted on the ends of the main lead wires 24a, 25a by a pair of metal clips 22a in the manner previously described.

Figure 4:
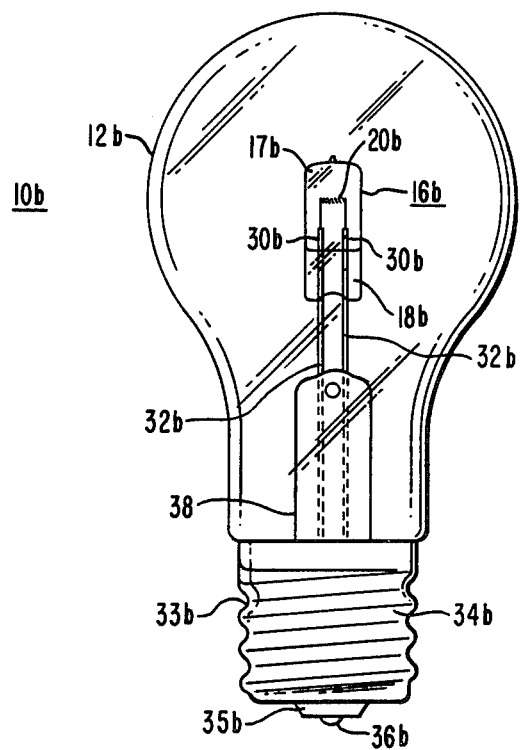

The general lighting lamp unit 10b shown in FIG. 4 also contains a compact halogen-cycle lamp 16b having the structural features previously described. However, in accordance with this embodiment the outer envelope 12b is of conventional pear-shape and is sealed to a glass stem 38 which serves as a support member for the rigid outer lead wires 32b that extend from the press-seal 18b formed on the end of the halogen lamp envelope 17b. The halogen lamp 16b is thus held in centralized position within the outer envelope 12b solely by the lamp lead wires 32b and stem 38 without the aid of any holder-clips or additional lead wires.

While the halogen atmosphere in the inner lamp components 16a, 16b of the general lighting lamp units 10a, 10b can be provided by dosing the inner lamp envelopes 17a, 17b with small carefully-controlled amounts of methylene bromide as previously described, equivalent dosages of iodine (or an iodine-producing compound) are preferred. The purple "tint" of the free iodine produces an inherent color-correcting effect that gives the generated light a "warm" coloration which is preferred for general lighting applications.

As in the case of the sealed-beam lamp 10 shown in FIG. 1, the envelopes 17a, 17b of the halogen lamp components 16a, 16b are made of a selected hard glass and the fill gas pressure in the halogen lamps is in the range of from about 600 to 700 Torr and so correlated with the fill gas pressure in the outer envelopes 12a, 12b that the total gas pressure is maintained at about 1,000 Torr. The fill gas pressure in the outer envelope is thus within the range of from about 300 to 400 Torr.

While nitrogen is preferred as the non-oxidizing gas in the outer envelope, other suitable inert gases such as argon, krypton, or xenon can also be used if the additional cost is tolerable. Mixtures of such gases, with or without nitrogen, would also be suitable.

I claim as my invention:
1. An electric lamp unit comprising, in combination;
   a sealed housing that has a light-transmitting portion and contains a non-oxidizing gaseous atmosphere at a predetermined pressure, and
   a compact halogen-cycle type incandescent lamp that is supported within said housing and has a sealed envelope that contains a controlled amount of a selected halogen and an inert fill gas at a predetermined pressure below about one atmosphere, the envelope of the halogen-cycle incandescent lamp being composed of a hard glass that is selected from a group of such glasses that have different softening temperatures all of which are such that the envelope will withstand the elevated temperatures required to sustain the halogen cycle, and the gas pressures within said housing and halogen-cycle lamp envelope being correlated with one another in a manner such that (a) the total gas pressure does not exceed about 1,000 Torr and (b) the gas-pressure relationship establishes a thermal condition within the operating lamp unit which causes the envelope of the halogen-cycle lamp to operate at a temperature which is sufficient to sustain the halogen cycle but is below the softening temperature of the particular hard glass from which the lamp envelope is fabricated.

2. The electric lamp unit of claim 1 wherein;

the gas pressure within said housing is in the range of from about 300 to about 400 Torr, and the fill gas pressure within the halogen-cycle incandescent lamp is in the range of from about 600 to about 700 Torr.

3. The electric lamp unit of claim 2 wherein;

the envelope of the halogen-cycle incandescent lamp is composed of borosilicate type glass or aluminosilicate type glass, and the halogen in said halogen-cycle lamp comprises bromine or iodine.

4. The electric lamp unit of claim 3 wherein;

the compact halogen-cycle incandescent lamp contains bromine that is introduced in the form of methylene bromide, and the methylene bromide content in the compact halogen-cycle lamp, as manufactured, is (a) about 0.2% by volume when the lamp envelope is composed of borosilicate type glass, and (b) about 0.1% by volume when the lamp envelope is composed of aluminosilicate type glass.

5. The electric lamp unit of claim 3 wherein;

the fill gas in the halogen-cycle incandescent lamp is selected from the group consisting of argon, krypton, xenon and mixtures thereof with or without nitrogen, and the non-oxidizing atmosphere in the outer envelope is a gas selected from the group consisting of nitrogen, argon, krypton, xenon and mixtures thereof.

6. The electric lamp unit of claim 3 wherein;

the sealed housing comprises a concave reflector component and a light-transmitting cover component that are joined together and provide an outer envelope and a sealed-beam type lamp unit, and the compact halogen-cycle incandescent lamp is supported within the outer envelope lamp by conductor means carried by the reflector component.

7. The sealed-beam lamp unit of claim 6 wherein;

the cover component is a lens that provides a predetermined light-beam pattern and the lamp unit thus constitutes a sealed-beam headlamp that is adapted for use on a motor vehicle, and the compact halogen-cycle incandescent lamp contains bromine and is so disposed within the headlamp that the filament of said halogen-cycle lamp is oriented in predetermined optical relationship with the reflector component.

8. The electric lamp unit of claim 3 wherein;

the sealed housing comprises an outer envelope of bulbous configuration that is terminated by a base member having a pair of contacts, and the compact halogen-cycle incandescent lamp is supported within the bulbous outer envelope by a pair of lead-in wires that are connected to the base contacts and the electric lamp unit thus comprises a general service type incandescent lamp.

9. The general service type incandescent lamp of claim 8 wherein the halogen-cycle lamp contains iodine, and the base member is of the screw-in type.

10. In a halogen-cycle type incandescent lamp that contains a coiled tungsten filament, an inert fill gas, and a controlled quantity of bromine, the improvement comprising the combination of;

a lamp envelope that is composed of a hard glass from the group consisting of borosilicate type glass and aluminosilicate type glass, the fill gas is a gas selected from the group consisting of argon, krypton, xenon and mixtures thereof with or without nitrogen, and the fill gas pressure is in the range from about 600 to about 700 Torr, and a thermally-dissociable source for providing said bromine comprising methylene bromide in an amount of from about 0.1% to about 0.2% by volume;

the methylene bromide content being (a) about 0.1% by volume when the lamp envelope is composed of aluminosilicate type glass and (b) about 0.2% by volume when the lamp envelope is composed of borosilicate type glass.

11. The improved halogen-cycle type incandescent lamp of claim 10 wherein the nominal wattage rating of the lamp is so correlated with the physical size of the hard-glass envelope that the power loading of the lamp is from about 22 to 42 watts cubic centimeter of envelope volume when the lamp is operated at said nominal wattage rating.

12. The improved halogen-cycle type incandescent lamp of claim 10 wherein the fill gas comprises a mixture of krypton and nitrogen.

* * * * *